(12) United States Patent
Kako et al.

(10) Patent No.: US 9,065,123 B2
(45) Date of Patent: Jun. 23, 2015

(54) BATTERY MODULE

(75) Inventors: Masahiro Kako, Obu (JP); Mikiharu Yoshizaka, Obu (JP); Tatsuhisa Matsuda, Obu (JP); Fusatomo Miyake, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 165 days.

(21) Appl. No.: 13/817,875

(22) PCT Filed: Aug. 1, 2011

(86) PCT No.: PCT/JP2011/067589
§ 371 (c)(1),
(2), (4) Date: Mar. 7, 2013

(87) PCT Pub. No.: WO2012/023421
PCT Pub. Date: Feb. 23, 2012

(65) Prior Publication Data
US 2013/0202929 A1    Aug. 8, 2013

(30) Foreign Application Priority Data

Aug. 20, 2010  (JP) ................. 2010-184992
Oct. 27, 2010  (JP) ................. 2010-241004

(51) Int. Cl.
*H01M 10/48*   (2006.01)
*H01M 2/20*    (2006.01)
(Continued)

(52) U.S. Cl.
CPC ............ *H01M 2/202* (2013.01); *H01M 10/502* (2013.01); *H02J 7/0068* (2013.01); *H01M 10/635* (2015.04); *H01M 10/6561* (2015.04); *H01M 10/613* (2015.04)

(58) Field of Classification Search
CPC .................. H01M 2/202; H01M 10/502
USPC ............................................. 429/90
See application file for complete search history.

(56) References Cited

U.S. PATENT DOCUMENTS 6,168,470 B1   1/2001   Ikede et al.
6,240,637 B1   6/2001   Ikede et al.

FOREIGN PATENT DOCUMENTS

CN   101769952 A   7/2010
DE   19847190 A    6/1999
(Continued)

OTHER PUBLICATIONS

PCT/JP2011/067589 International Search Report dated Feb. 23, 2012, (3 pages).
(Continued)

*Primary Examiner* — Jonathan Jelsma
(74) *Attorney, Agent, or Firm* — Conley Rose, P.C.

(57) ABSTRACT

The present invention aims to decrease in the number of components and to achieve An improvement in terms of workablility for assembly.
Bus bars (11) and (12) electrically connecting the positive and negative poles of adjacent unit batteries (1) and a detection circuit (13) configured to detect the voltage of the unit batteries (1) are integrally molded with resin into a bus bar module (10). One bus bar (11) of the bus bar module (10) connects the positive pole of one unit battery (1a) and the negative pole of a positive pole side unit battery (1b) situated on the positive pole side of the unit battery (1a) in the battery module; and the other bus bar (12) connected to the negative pole of the unit battery (1a) is connected to the positive pole of a negative pole side unit battery (1c) situated on the negative pole side of the unit battery (1a) in the battery module. The detection circuit (13) is arranged between the bus bar (11) and the bus bar (12), and detects the voltage of the unit battery (1a) and of the positive pole side unit battery (1b).

10 Claims, 14 Drawing Sheets

(51) Int. Cl.
*H01M 10/63* (2014.01)
*H02J 7/00* (2006.01)
*H01M 10/635* (2014.01)
*H01M 10/6561* (2014.01)
*H01M 10/613* (2014.01)

(56) References Cited

FOREIGN PATENT DOCUMENTS

| | | |
|---|---|---|
| GB | 2330253 A | 4/1999 |
| JP | 8-162171 A | 6/1996 |
| JP | 11120986 A | 4/1999 |
| JP | 2000123802 A | 4/2000 |
| JP | 2000223098 A | 8/2000 |
| JP | 2001325931 A | 11/2001 |
| JP | 2001345082 A | 12/2001 |
| JP | 2007323952 A | 12/2007 |
| JP | 2008226744 A | 9/2008 |
| JP | 2009289429 A | 12/2009 |
| JP | 2010-97722 A | 4/2010 |
| JP | 2010160930 A | 7/2010 |

OTHER PUBLICATIONS

Notification of Reasons for Rejection dated Jan. 28, 2014 for Japanese Patent Application No. 2010-241004.
Chinese Patent Application No. 201180050081.0, Office Action dated Sep. 30, 2014, 17 pages.

| Transmit | #1 | Voltage | Temp. | Pass/Fail | #2 | Voltage | Temp. | Pass/Fail | #3 | Voltage | ... |

FIG. 5

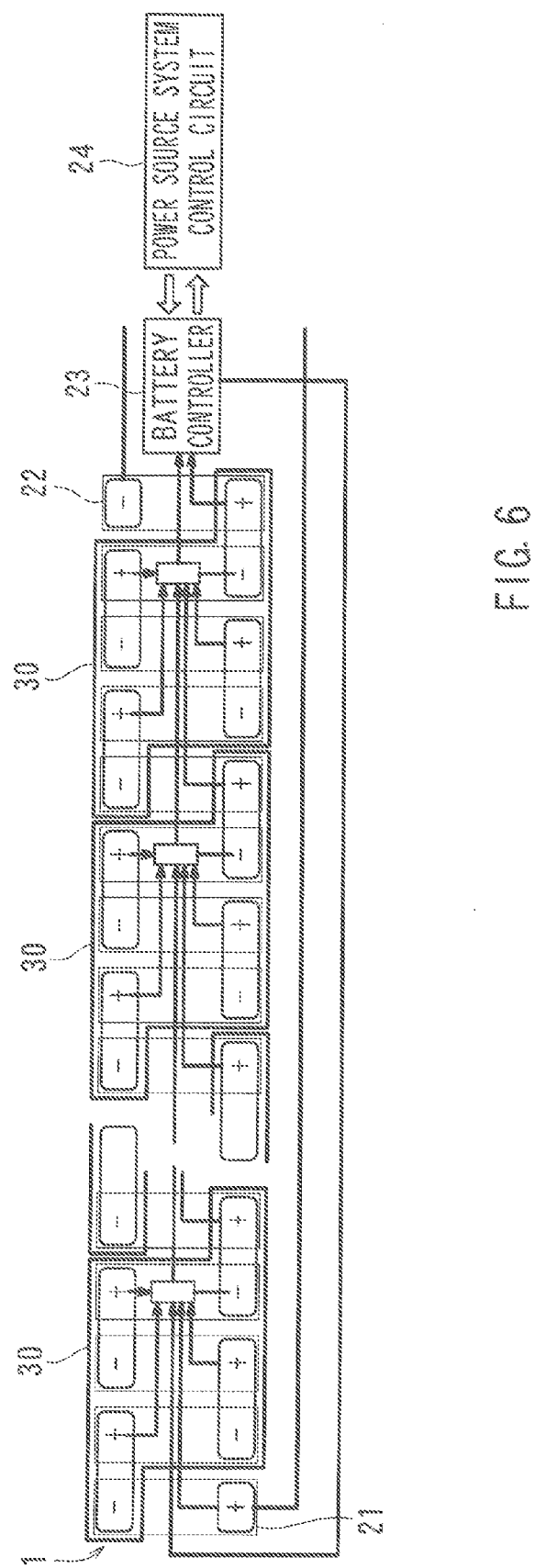
F I G. 6

BATTERY MODULE

TECHNICAL FIELD

The present invention relates to a battery module in which a plurality of unit batteries serving as secondary batteries are arranged such that the positive and negative poles of the adjacent unit batteries are situated alternately and in which the positive and negative poles of the adjacent unit batteries are electrically connected to each other to thereby connect all the unit batteries in series.

BACKGROUND ART

Japanese Laid-Open Patent Publication No. 2009-289429 mentioned below discloses such a battery module. According to the disclosed technique, the voltage of each unit battery is detected in order to check the residual battery capacitance. For this purpose the positive and negative poles of each unit battery are provided with connection terminals. The connection terminals are placed on a resin board, and are further electrically connected on a relay board to be connected to a predetermined processing circuit for voltage detection.

SUMMARY OF THE INVENTION

Problems to be Solved by the Invention

However, the technique disclosed in Japanese Laid-Open Patent Publication No. 2009-289429 involves a rather large number of components such as the resin board and the relay board. Thus, it involves a high cost and takes a lot of time for assembly operation.

In view of the above problems, it is as object of the present invention to integrally mold a bus bar connecting the unit batteries in series in resin, inclusive of the circuit for detecting the voltage of each unit battery, thereby suppressing an increase in the number of components and achieving an improvement in terms of workability for assembly.

Summary of the Invention

According to a first aspect of the invention, there is provided a battery module in which a plurality of unit batteries serving as secondary batteries are arranged such that the positive and negative poles of the adjacent unit batteries are situated alternately and in which the positive and negative poles of the adjacent unit batteries are electrically connected to each other to thereby connect all the unit batteries in series, wherein bus bars electrically connecting the positive and negative poles of the adjacent unit batteries and a detection circuit for detecting the voltage of the unit batteries are integrally molded of resin into a bus bar module, wherein one bus bar of the bus bar module connects the positive pole of one unit battery and the negative pole of a positive pole side unit battery situated on the positive pole side of the one unit battery in the battery module, and the other bus bar connected to the negative pole of the one unit battery is connected to the positive pole of a negative pole side unit battery situated on the negative pole side of the one unit battery in the battery module, and wherein the detection circuit is arranged between the one bus bar and the other bus bar and is configured to detect the voltage of the one unit battery and of the positive pole side unit battery.

According to the first aspect of the invention, the hiss bar connecting the unit battery constituting the object of detection is integrally molded in resin together with the detection circuit, so that it is possible to eliminate such components for integration as the resin board and the relay board, thus suppressing an increase in the number of components and helping to achieve an improvement in terms of workability for assembly.

Further the detection circuit is arranged in a dispersed fashion in each bus bar module, so that, as compared with the case in which the detection circuit is arranged in a concentrated fashion, the voltage applied to the detection circuit is advantageously lower, and the voltage withstanding performance of the detection circuit can be made lower. Thus it is possible to make the detection circuit inexpensive.

Furthermore, the detection circuit is between bus bars and in close proximity to the unit batteries, so that the connection route between the detection circuit and the unit batteries can be short, making it possible to suppress a reduction in voltage in the connection route and to suppress superimposition of noise via the connection route. As a result, it is possible to achieve an improvement in terms of accuracy in voltage detection.

According to a second aspect of the present invention, there is provided a battery module according to the first aspect of the invention, wherein a plurality of the bus bar modules are provided; an input terminal and an output terminal of the detection circuit in each bus bar module respectively protrude toward the adjacent bus modules; the input terminals and the output terminals are successively connected in the order in which they are arranged in the battery module; and each detection circuit transmits the detected voltage to a battery controller for conducting charge and discharge of die batteries properly as a series of serial signals.

According to the second aspect of the invention, voltage signals are transmitted in succession in the form of a series of serial signals in the order of arrangement in the battery module, and it is possible to discriminate the voltage signals from each other by the battery controller by the order of transmission without having to impart any address to each detection circuit, so that it is possible to eliminate memory for storing addresses, and to omit the processing for discriminating addresses from each other. Further, an increase or reduction in the number of unit batteries can be coped with solely through an increase in the number of detection circuits connected, and there is no need to take any special measures in this regard.

According to a third aspect of the invention, there is provided a battery module according to the first or second aspect of the invention, wherein there axe provided a plurality of the bus bar modules; and the bus bar modules adjacent to each other are connected by connection portions provided on adjacent side portions of the bus modules.

According to the third aspect of the invention, it is possible to directly connect the bus bar modules to each other by the connection portions, so that there is no need to provide a case, a board, etc. for fixing the bus bar modules in position.

According to a fourth aspect of the present invention, there is provided a battery module according to one of the first through third aspects of the invention, wherein the bus bars of the bus bar modules are two or four bits bars connecting the positive and negative poles so as to directly connect in series three or five unit batteries, and wherein the detection circuit detects the voltage of two or four unit batteries of the three or five unit batteries.

According to the fourth aspect of the invention, generally speaking, a battery module is formed by unit batteries in a number which is a multiple of four, so that, when a bus bar module is formed by two or four bus bars it is possible to cope with an increase or reduction in the number of unit batteries through an increase or reduction in the number of such bus bar modules.

According to a fifth aspect of the present invention, there is provided a battery module according to one of the first through fourth aspects of the invention, wherein the detection circuit is equipped with a detection terminal connected to the positive and negative poles of each unit battery constituting the object of detection, and an output terminal outputting a detection signal, and wherein each terminal protrudes from the detection circuit along the direction in which the unit batteries are arranged when formed into a battery module.

According to the fifth aspect of the invention, each terminal of the detection circuit protrudes along the direction in which the unit batteries are arranged, so that even when there is a change in the direction in which the unit batteries are arranged as each unit battery undergoes charge and discharge, no force is applied so as to bend each terminal, and there is no fear of the proximal portion of each terminal undergoing fatigue fracture even if the charge and discharge is repeated. Further, in the bus bar module, the detection circuit is between one bus bar and another bus bar, and is sufficiently smaller as compared with the bus bars, so that, when a plurality of the bus bar modules are connected together, it is possible to secure a relatively large space between the detection circuits, thus making it possible to enhance the degree of freedom in terms of the layout of the connection lines between the terminals and the unit batteries.

According to a sixth aspect of the present invention, there is provided a battery module according to one of the first through fifth aspects of the invention, wherein the detection circuit is equipped with a detection terminal connected to both die positive and negative poles of each unit battery constituting the object of detection, and an output terminal outputting a detection signal, and wherein at least the portion where the detection terminal and the output terminal protrude from the detection circuit is covered with molding resin.

According to the sixth aspect of the invention, the terminals of the detection circuit are covered with molding resin and consolidated, so that, even when the outer configuration of each unit battery expands or contracts as each unit battery undergoes charge and discharge, the resultant displacement does not affect the terminals of the detection circuit, thus making it possible to protect the terminals of the detection circuit. Further, since the terminals of the detection circuit are protected, press molding to be conducted after the attachment of the detection circuit can be performed without affecting the terminals of the detection circuit.

According to a seventh aspect of the present invention, there is provided a battery module according to one of the first through sixth aspects of the invention, wherein a displacement absorption portion is provided between the end portions of the bus bar connected to both the positive and negative poles of each unit battery, and wherein the displacement absorption portion permits mechanical relative displacement while maintaining the electrical connection between the end portions of the bus bar.

According to the seventh aspect of the invention, even If the outer configuration of each unit battery undergoes expansion or contraction with the charge and discharge of each unit battery, the accompanying displacement Is absorbed by die displacement absorption portion of the bus bar, so that it is possible to prevent an excessive force from being applied to the bus bar. Further, even if when connecting the bus bar to the positive and negative pole terminals of die unit battery, there is a dimensional error between them, such error is absorbed by the displacement absorption portion, making it possible to perform the assembly in the normal fashion.

According to an eighth aspect of the present invention, there is provided a battery module according to one of the first through seventh aspects of the invention, wherein the detection circuit is equipped with a detection terminal connected to both the positive and negative poles of each unit battery constituting the object of detection, and an output terminal configured to output a detection signal, wherein the detection terminal is connected to the other end of a connection line one end of which is connected to the bus bar, wherein the output terminal is connected the other end of a connection line one end of which is connected to an output side circuit, wherein there is provided a displacement absorption portion at least in a part of the route between each terminal of the detection circuit and each connection line thus connected to each other and wherein the displacement absorption portion permits mechanical relative displacement while maintaining the electrical connection of both ends of the displacement connection portion or the connection lines.

In the eighth aspect of the invention, the output side circuit is an output circuit such as a battery controller configured to receive the output of the detection circuit, or a circuit configured to relay an output signal to the output circuit.

According to the eighth aspect of the invention, the displacement absorption portion is provided in the route between the terminals of the detection circuit and the connection lines, so that the displacement caused by the charge and discharge of the unit battery is absorbed by the displacement absorption portion, and it is possible to prevent such displacement from affecting the terminals of the detection circuit and the connection line, thus making it possible to protect them from deformation or disconnection. Further, even if the unit battery and the bus bar module are of low dimensional precision, it is possible to absorb any dimensional error by the displacement absorption portion, making it possible to perform the assembly in the normal fashion.

According to a ninth aspect of the present invention, there is provided a battery module according to the eighth aspect of the invention, wherein the displacement absorption portion has a metal plate constituting the terminals or connection hues and exhibiting raised portions raised erect in a direction orthogonal to the plane where the terminals and the connection lines are arranged, and wherein the distal end portion sides of the raised portions of the metal plate are connected to each other, with the proximal end portion sides of the raised portions being capable of being spaced away from each other.

According to the ninth aspect of the invention, it is possible to attain the same effect as that of the eighth aspect of the invention with a simple construction.

According to a tenth aspect of the invention, there is provided a battery module according to one of the first through ninth aspects of the invention, wherein, when connected to the positive and negative poles of the unit battery, the bus bar module is situated so as to be spaced away from the outer surface of the unit battery except for the positive and negative poles thereof by a predetermined gap.

According to the tenth aspect of the invention, air flows through the above-mentioned gap, so that the bus bar module and the unit battery are cooled, making it possible to suppress deterioration in performance and degeneration with an increase in their temperature.

BRIEF DESCRIPTION OF THE DRAWINGS

FIG. 5 is an explanatory view for illustrating serial signals in the embodiment of FIG 1;

FIG. 6 is an explanatory view illustrating the overall construction of another embodiment of the present invention;

DETAILED DESCRIPTION OF THE INVENTION

In the following, an embodiment of the present invention will be described with reference to the drawings.

Figure 1:
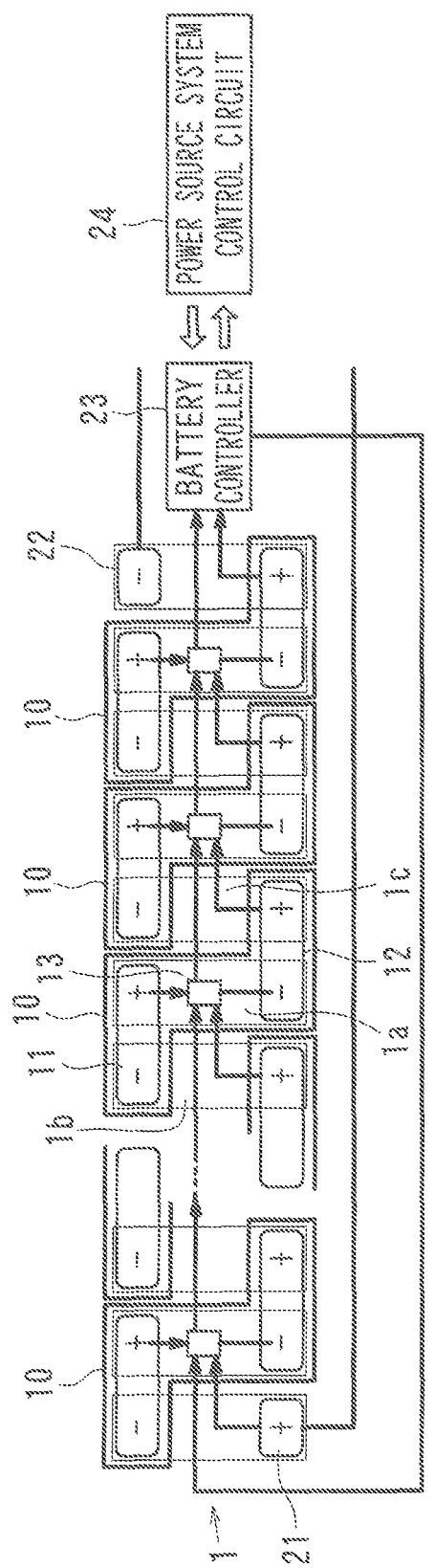
FIG. 1 is an explanatory view of the overall construction of an embodiment of the present invention.

As an embodiment of the present invention, FIG. 1 shows a has bar module 10 in which the present invention is applied to a lithium ion battery of 96 cells and of 346 V for hybrid vehicles. Here, 96 unit batteries 1 are arranged such that the positive and negative poles of the adjacent unit batteries are alternately situated; electrical connection is effected between the adjacent unit batteries, whereby all the unit batteries are connected in series to form a battery module. The positive and negative poles 21 and 22 of the battery module thus formed by connecting the unit batteries 1 in series are connected to a hybrid vehicle motor (not shown) via a control circuit.

Bus bars 11 and 12 electrically connecting the positive and negative poles of the adjacent unit batteries 1, and a detection circuit 13 for detecting the voltage of the unit batteries 1, are integrally molded through insert resin molding to form a bus bar module 10. The bus bar module 10 will be described in detail with reference to FIGS. 1 and 2.

One bus bar 11 of the bus bar module 10 connects the positive pole of one unit battery 1a and the negative pole of a positive pole side unit battery 1b situated on the positive pole side compared with the one unit battery 1a in the battery module, and the other bus bar 12 connected to the negative pole of the one unit battery 1a is connected to the positive pole of a negative pole side unit battery 1c situated on the negative pole side compared with the one unit battery 1a in the battery module. The detection circuit 13 is arranged between the one bus bar 11 and the other bus bar 12, and is configured to detect the voltage of the one unit battery 1a and of the positive pole side unit battery 1b. The bus bars 11 and 12 and the detection circuit 13 are integrated through resin insert molding to form a resin molding 19. Thus, they are entirely embedded in resin except for the connection portions of the bus bars 11 and 12 connected to the unit batteries 1. Formed on the adjacent side portions of the adjacent bus bar modules 10 are connection portions 15 through 18 for connecting the bus bar modules 10 to each other. Due to the connection portions 15 through 18, it is possible to directly connect the bus bar modules to each other to integrate them with each other, so that there is no need to provide a case, a board, etc, for fixing the bus bar modules in position.

Figure 3:
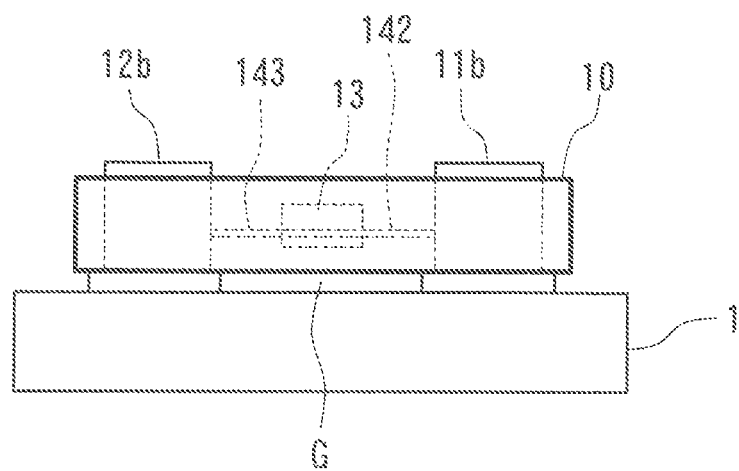
FIG. 3 is a side view of a bus bar module according to the embodiment of FIG. 1 as connected to a unit battery.

FIG. 3 shows a state in which the bus bar module 10 has been connected to the positive and negative poles 11b and 12b of the unit battery 1. In this case, the positive and negative poles 11b and 12b protrude from the portions of foe upper surface of the unit battery 1 near both ends thereof, and the bus bars 11 and 12 are connected to the positive and negative poles 11b and 12b. At this time, the bus bar module 10 is placed at lower step portions of the positive and negative poles 11b and 12b of the unit battery 1, and is spaced away from the outer surface of the unit battery 1 by a predetermined gap G. Due to the provision of this gap G, air is allowed to flow through the gap G, thereby cooling the bus bar module 10 and the unit battery 1. Thus, it is possible to suppress deterioration in performance and degeneration caused by an increase m their temperature.

Figure 9:
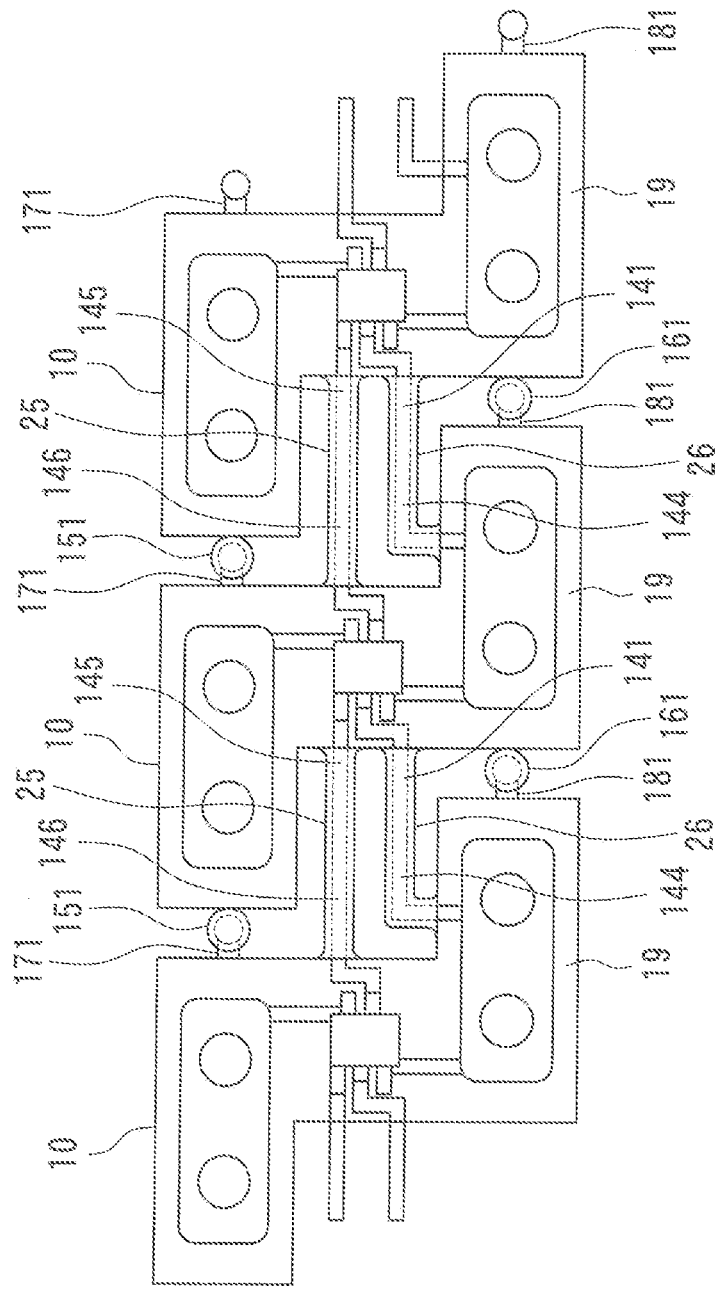
FIG. 9 is an explanatory view of an example of how a plurality of bus bar modules according to the embodiment of FIG. 1 are connected together.
Figure 10:
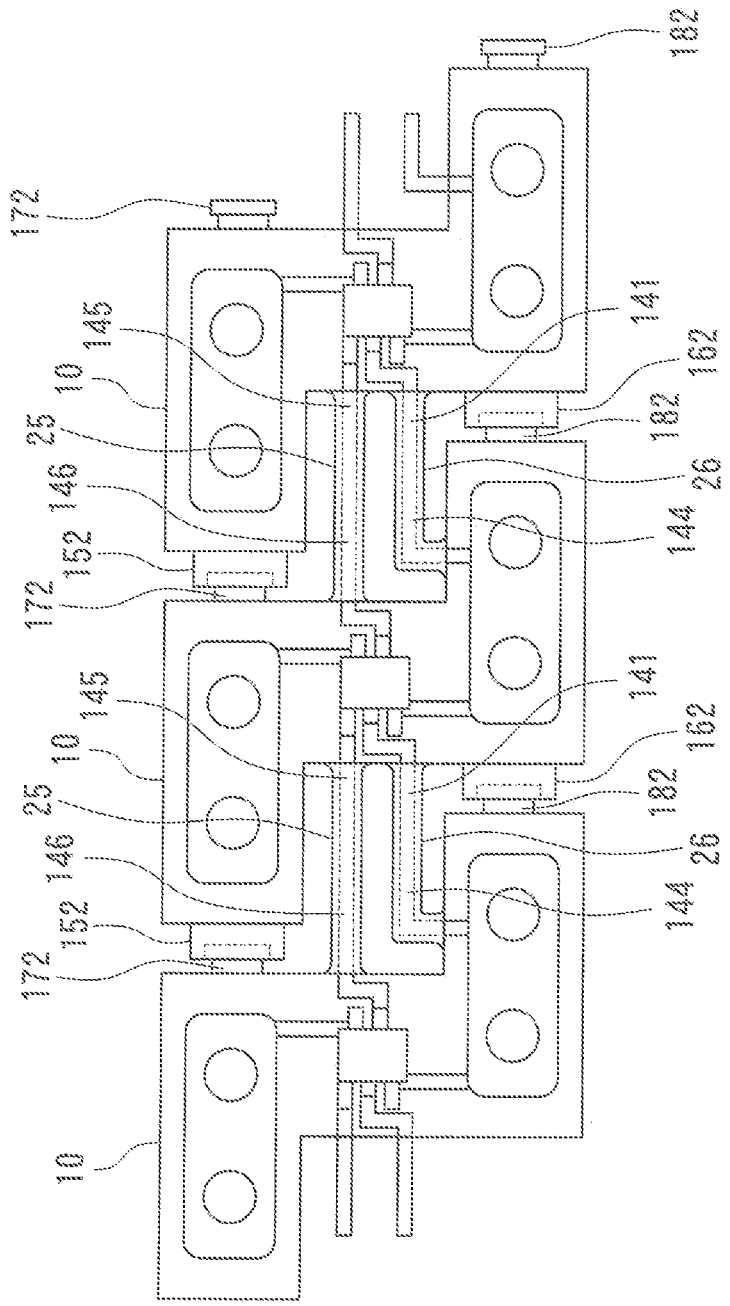
FIG. 10 is an explanatory view of another example of how a plurality of bus bar modules according to the embodiment of FIG. 1 are connected together.

FIGS. 9 and 10 show examples in which a plurality of the bus bar modules 10 are connected to each other. In the example shown in FIG. 9, the distal ends of connection protrusions 171 and 181 constituting the connection portions 17 and 18 of the bus bar modules 10 are formed as protrusions whose distal ends are formed of a spherical configuration, and the distal ends of connection protrusions 151 and 161 constituting the connection portions 15 and 16 are formed in a configuration adapted to enclose the spherical portions of die connection protrusions 171 and 181; the connection protrusions 171 and 151, and the connection protrusions 181 and 161, which are opposite each other when connecting the bits bar modules 10 to each other, are connected together through fusion-bonding by heating while fit-engaged with each other. At this time connection lines 146 and 145, and connection lines 144 and 141, which mutually protrude from the bus bar modules 10 are welded to each other through welding; then, molding is provided around the connection lines 146 and 145, and around the connection lines 144 and 141, by using resin 25 and 26, whereby the connection lines are integrated with resin moldings 19.

In the example shown in FIG. 10, the distal ends of connection protrusions 172 and 182 constituting the connection portions 17 and 18 of the bus bar modules 10 are formed as protrusions whose distal ends are formed of a columnar configuration, and the distal ends of connection protrusions 152 and 162 constituting the connection portions 15 and 16 are formed in a configuration adapted to enclose the columnar portions of the connection protrusions 172 and 182; the connection protrusions 172 and 152, and the connection protrusions 182 and 162, which are opposite each other when connecting the bus bar modules 10 to each other, are connected together through fusion-bonding by heating while fit-engaged with each other. At this time, connection lines 146 and 145, and connection lines 144 and 141, which mutually protrude from the bus bar modules 10 are welded to each other through welding; then, molding is provided around the connection lines 146 and 145, and around the connection lines 144 and 141, by using resin 25 and 26, whereby the connection lines are integrated with resin moldings 19 as in the case of the example of FIG. 9.

In this way, a plurality of bus bar modules 10 are connected to each other, whereby it is possible to treat a plurality of bus bar modules 10 as an integral unit without having to use any special case, board or the like.

Figure 2:
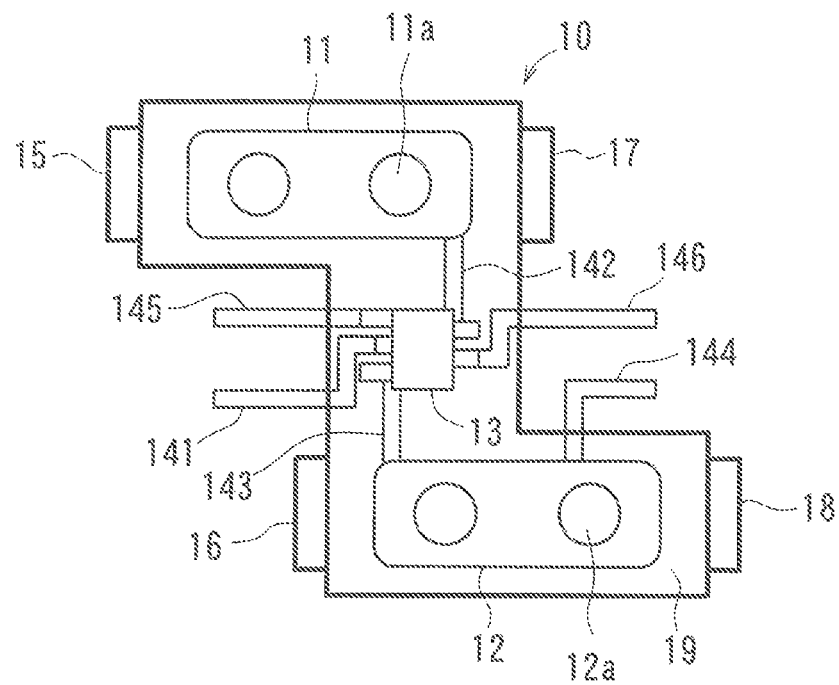
FIG. 2 is an explanatory view of a bus bar module in the embodiment of FIG. 1.

In FIG. 2, connection lines 142 and 143 connecting the detection circuit 13 and the bus bars 11 and 12, a connection line 141 (144) connected to the bus bars of the adjacent, input-side bus bar module 10, a connection line 146 connected to the detection circuit of the adjacent, output-side bits bar module 10, and, further, a connection line 145 connected to the detection circuit of the adjacent, input-side bus bar module 10 are also insert-molded with the detection circuit 13 to be thereby integrated. The connection lines of the adjacent, input-side or output-side bus module 10 are connected through welding as described above. To protect the connection lines, it is also possible to enlarge the size of the portions of the resin molding 19 covering the connection lines, thickly covering the proximal portions of the connection lines except for the distal end portions thereof.

In this way, the bus bars 11 and 12 connected to the unit battery 1 constituting the object of detection are integrally molded in resin together with the detection circuit 13, so that there is no need to provide such components for integration as a resin board and a relay board, thus decreasing the number of components and helping to achieve an improvement in leans of workability for assembly. In the state in which the bus bars 11 and 12 are connected to the positive and negative poles of the unit batteries 1, the bus bar modules 10 are fixed to the unit batteries 1 by screws (not shown).

In the case of this battery module, there are provided 48 bus bar modules 10; as shown in FIG. 1, the adjacent detection circuits 13 of the bus bar modules 10 are successively connected to each other, and the detection circuits 13 transmit the detected voltage to a battery controller 23 as a series of serial signals. As is well known in the art the battery controller 23 allows the batteries to undergo proper charge and discharge; it serves to prevent over-discharge or overcharge of each unit battery 1, and to perform control so as to maintain the requisite charge balance between the unit batteries 1. Further the battery controller 23 transmits a signal to a power source system control circuit 24, reflecting the condition of each unit battery 1 in vehicle control.

Figure 4:
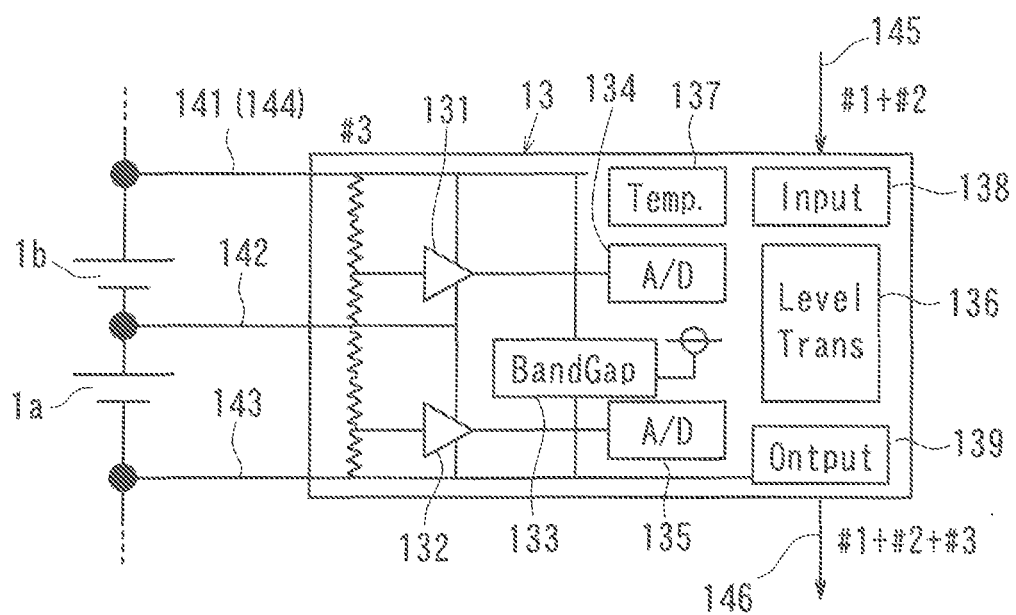
FIG. 4 is an electric circuit diagram illustrating a bus bar module of the embodiment of FIG. 1.

FIG. 4 shows the electric circuit of one bus bar module 10. The detection circuits 13 are connected via the connection lines 143 (144) through 143 so as to detect the voltage of one unit battery 1a and of the positive pole side unit battery 1b. Inside the detection circuit 13, there are provided operation amplifiers 131 and 132 detecting the voltage of each unit battery 1, a reference voltage generation circuit 133 generating a reference voltage inside the detection circuit 13, A/D converters 134 and 135 converting analog signals from the operation amplifiers 131 and 132 to digital signals, a temperature detector 137 detecting the temperature of the portion around the detection circuit 13, an input circuit 138 receiving an output signal from the adjacent, input-side bus bar module 10 to perform pre-processing, a level transformer 136 configured to add the signals from the A/D converters 134 arid 135 and the temperature detector 137 to the output signal from the adjacent bus bar module 10 received by the input circuit 138 to generate serial signals, and an output circuit 139 for outputting the serial signals to the input circuit of the adjacent, output-side bus bar module 10. In the detection circuit 13 constructed described above, the voltage values of the two unit batteries 1 and the temperature around the unit batteries 1 are output as serial signals.

FIG. 5 shows the data frame of the serial signals. The detection circuit 13 at the first stage receives a transmission start trigger signal, and transmits data on detected voltage and temperature. Further, the determination results of over-discharge, overcharge, and overheating of the unit batteries 1 are also transmitted. Subsequent to the first stage, the voltages, temperature, and determination results of the second stage detection circuit 13 are added to the serial signals and are transmitted. From this onward transmission is conducted in succession for the third stage the fourth stage, etc.

In this way, she detected voltages and detected temperature of each detection circuit 13 are transmitted as serial signals, so that there is no need to individually provide an output signal line for each detection circuit, thus making it possible to perform signal transmission solely by a single signal line. Further, the detection circuit of each stage successively adds the signals of the transmission of that stage to the signals of the detection circuit of the input-side detection circuit and transmits them, and it is possible for the battery controller 23 to discriminate the voltage signals and temperature signals of the detection circuits by the transmission order, so that there is no need to impart an address to each detection circuit Thus, there is no need to provide address imparting memory, making it unnecessary to perform the processing of discriminating the detection circuit by address. Further, also regarding an increase or reduction in the number of unit batteries, there is no need to cope with it through any special operations; it is only necessary to increase the number of detection circuits connected.

Further, the detection circuit 13 is arranged in a dispersed fashion for each bus bar module 10, so that, as compared with the case where the detection circuit is arranged in a concentrated fashion, the voltage applied to the detection circuit is lower, thus making it possible to lower the voltage withstanding performance of the detection circuit. In the case of this embodiment, the voltage applied to the detection circuit 13 is that of two unit batteries, which is 7.2 V; in the case where the detection circuit for 96 unit batteries is arranged in a concentrated fashion the voltage applied to the detection circuit is 346 V: thus, it is possible to substantially lower the voltage withstanding performance. Thus, it is possible for the detection circuit to be made inexpensive. Further, the detection circuit is between bus bars, and in close proximity to the unit battery, so that it is possible for the connection route between the detection circuit and the unit battery to be short, making it possible to suppress a reduction in voltage in the connection route and noise superimposition via the connection route. As a result, it is possible to achieve an improvement in terms of voltage detection accuracy.

Next, modifications of the above-described embodiment will be described with reference to FIGS. 11 through 13. In these modifications measures are taken against a change in the dimension of the unit batteries as a result of beat generation of the unit batteries at die time of charge and discharge of die battery module.

Figure 11:
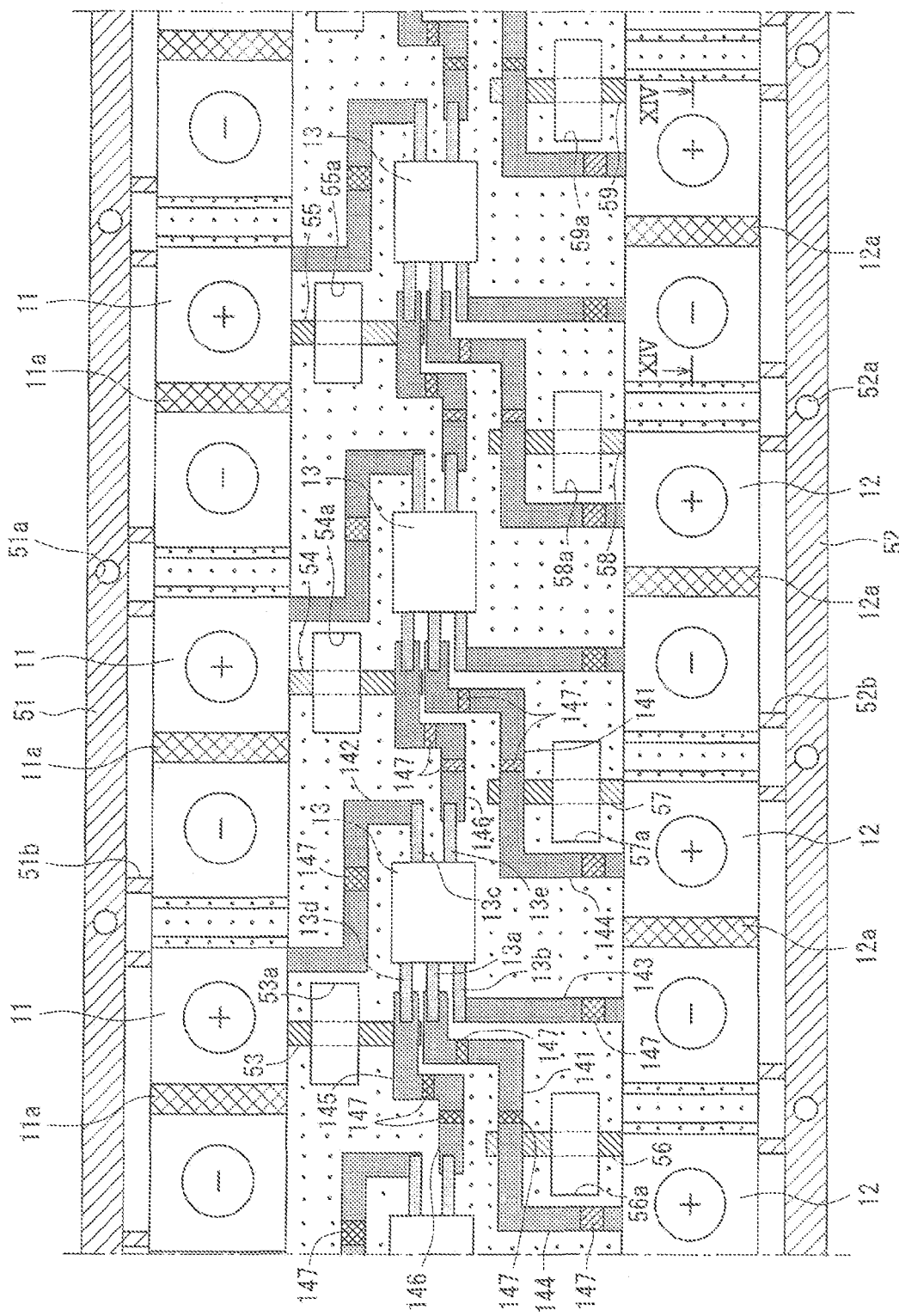
FIG. 11 is an explanatory view illustrating a first modification of the bus bar module of the embodiment of FIG. 1.

In FIG. 11, displacement absorption portions 11a and 12a are provided between the bus bars 11 and 12 connected to both the positive and negative poles of the unit batteries, and displacement absorption portions 147 are provided halfway through the connection lines 141 through 146 connected to the terminals 13a through 13e of the detection circuits 13. The displacement absorption portions 11a and 12a of the bus bars 11 and 12 are formed, as shown in FIG. 12 with respect to the bus bar 12, so as to be upwardly curved with respect to both end portions of the bus bar 12. That is, the displacement absorption portions 11a and 12a are formed such that the metal plates constituting the terminals 13a through 13e or the connection lines 141 through 146 are raised in a direction orthogonal to the plane in which they are arranged; the distal end sides of the raised portions of the metal plates are connected to each other, and the proximal portions of the raised portions can be spaced away from each other. Due to this formation, the displacement in the arrangement direction of the unit batteries 1 as a result of die charge and discharge of the unit batteries 1 is absorbed by the curved portions constituting the displacement absorption portions 11a and 12a through a change in the degree of curving thereof, thus preventing an excessive force from being applied to the bus bars 11 and 12. Further, when connecting the bus bars 11 and 12 to the positive and negative pole terminals of the unit batteries 1, even if there is a dimensional error between them the error is absorbed by the displacement absorption portions 11a and 12a, making it possible to perform the assembly in the normal fashion.

Figure 15:
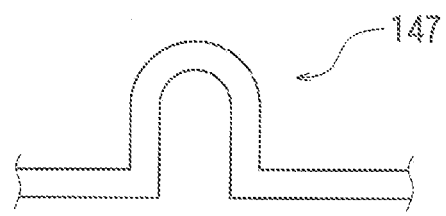
FIG. 15 is an enlarged plan view illustrating an example of a displacement absorption portion in the connection line of FIG. 11.

On the other hand, as shown in FIG. 15, the displacement absorption portions 147 provided halfway through the connection lines 141 through 146 are formed through curving of the connection lines 141 through 146 in the same plane and at the displacement absorption portions 147. As in the case of the displacement absorption portions 11a and 12a of the bus bars 11 and 12 mentioned above, regarding the displacement in the arrangement direction of the unit batteries 1 as a result of the charge and discharge of the unit batteries 1, the displacement absorption portions 147 provided halfway through the connection lines 141 through 146 absorb the displacement through a change in the degree of the curving thereof, thus preventing an excessive force from being applied to the connection lines 141 through 146.

As shown in FIG. 11, the displacement absorption portions 147 are provided in the connection lines 141 through 146 extending in the different directions of the connection lines 141 through 146, so that it is possible to absorb the displacement m the different directions of the unit batteries 1.

Figure 16:
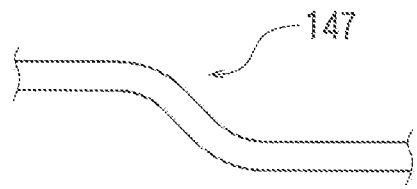
FIG. 16 is an enlarged plan view illustrating another example of a displacement absorption portion in the connection line of FIG. 11.
Figure 17:
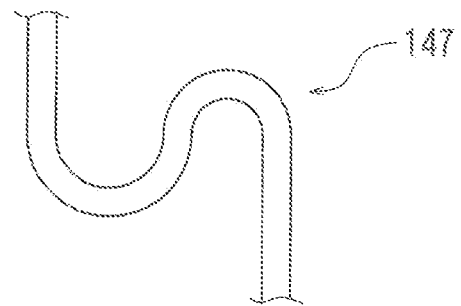
FIG. 17 is an enlarged plan view illustrating still another example of a displacement absorption portion in die connection line of FIG. 11.

As shown in FIG. 16, it is also possible for the displacement absorption portions 147 to be formed in an S-shaped curve; further, as shown in FIG. 17, it is also possible for them to be formed in a hairpin curve. These displacement absorption portions 147 also function in the same manner as the displacement absorption portions 147 of FIG. 15. It is possible to select optimum configurations tor these displacement absorption portions 147 according to the positions of the connection lines 141 through 146, and it is also possible to uniformly employ one and the same configuration.

Figure 19:
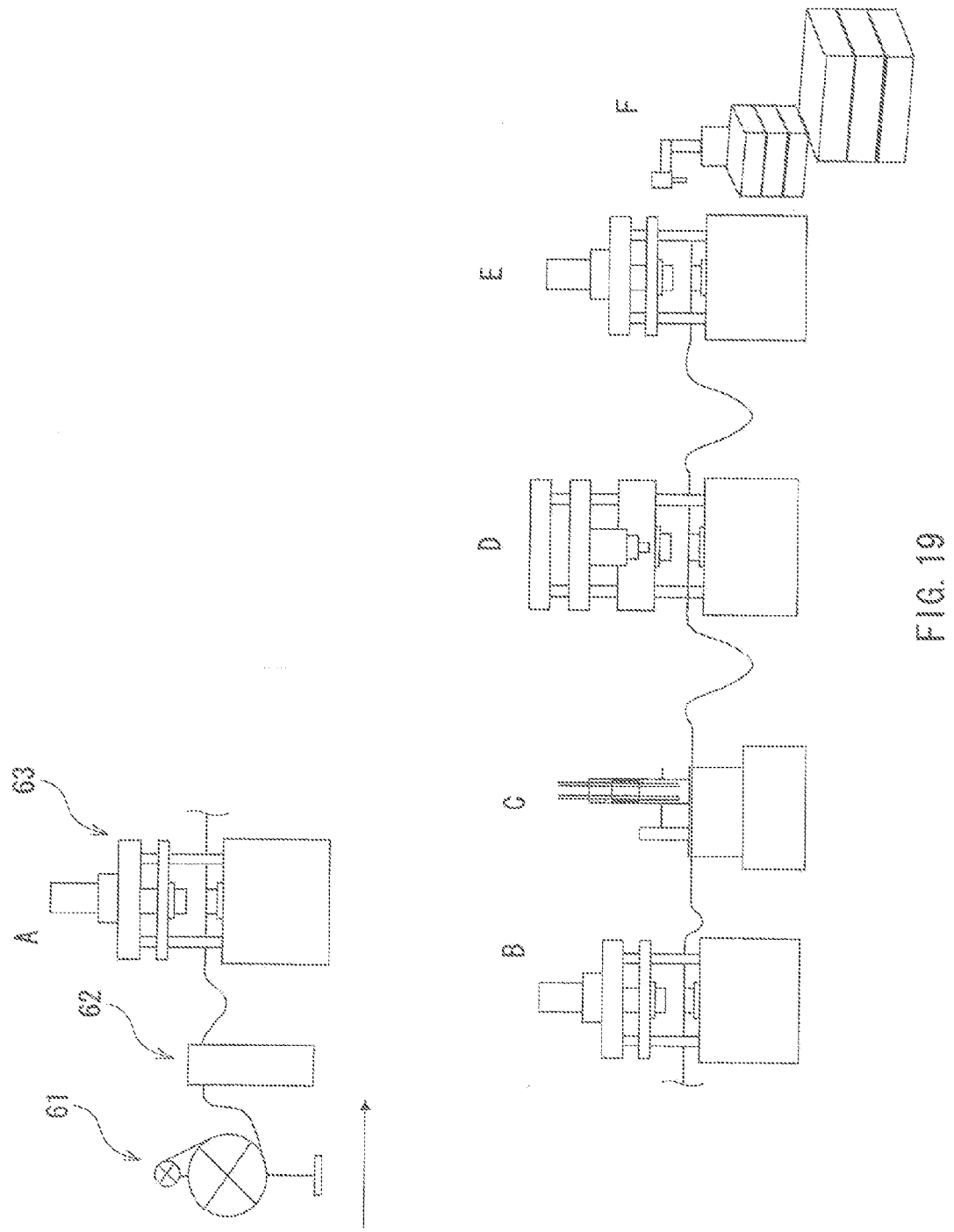
FIG. 19 is an explanatory view illustrating an example of a manufacturing process for the bus bar modules shown in FIGS. 11 through 13.

The modification of FIG. 11 is formed by connecting together a plurality of bus modules 10 according to die embodiment shown in FIG. 2. FIG. 19 shows a manufacturing process for the same: first, in a press work step A, a press material taken up into the form of a roll undergoes press work by a press machine 63, and half-finished products of the bus bar module 10 consisting of the bus bars 11 and 12, the connection lines 141 through 146, and connecting members 51 through 59 of FIG. 11 are formed through drawing. The press work step A employs a press work material straightening device 62.

The connecting members 51 and 52 arranged at the top and bottom of FIG. 11 have pilot holes formed at fixed intervals; they are used for the positioning of the press products with respect to the press die when feeding the press products forwards at the time of press work.

In the drawing, the connecting members 51 through 59 are indicated by shading; they serve to connect together the bus bars 11 and 12 and foe connection lines 141 through 146 so that they may not be scattered but well collected after the press work. In FIG. 11, the connecting members 51b connect the connecting member 51 on the upper side and the bus bars 11, and the connecting members 52b connect the connecting member 52 on the lower side and the bus bars 12.

In FIG. 19, in a bending step B following die press work step A, being bent is performed on the bus bars 11 and 12 of the press products, which are half-finished products, thereby forming the displacement absorption portions 11a and 12a. The bending step B employs the same take-up machine 64 as that employed in die press work step A. That is the half-finished products taken up by the take-up machine 64 from the press work step A to the bending step B are conveyed and installed.

Next, there is performed a welding step C, in which the detection circuits 13 are placed on die press products; the terminals 13a through 13e of the detection circuits 13 and the connection lines 141 through 146 are connected together both electrically and mechanically.

In a molding step D, resin insert molding is performed in regions where masking is effected by a large number of dots in FIG. 11. Through this molding the bus bars 11 and 12, the detection circuits 13, and the connection lines 141 through 146 are integrated with resin. At this time, there are provided blank regions 53a through 59a where no resin molding is performed in correspondence with the connecting members 53 through 59 in the intermediate region in the vertical direction in FIG. 11.

In a trimming step E of FIG. 19, the connecting members 51 through 59 are cut. Here, the upper and lower connecting members 51 and 52 In FIG. 11 are separated from the bus bars 11 and 12 by cutting the connecting members 51b and 52b, and, at the same time, the connecting members 53 through 59 in the intermediate portion in the vertical direction are also cut in the above-mentioned blank regions 53a through 59a.

The bus bar modules 10 thus formed are cut in an appropriate size and are packed in a packing step F of FIG. 19 for shipment.

While in the example of FIG. 11 the blank regions 53a through 59a for cutting the connecting members are provided in the positions connecting the bus bars 11 and 12 and the connection lines 141 through 146, it is also possible to provide connecting members connecting the connection lines to each other and to provide the blank regions there. Due to this arrangement, it is possible to increase the number of connection lines connected together by the connecting members in the half-finished products formed through press work in the press work step A, and it is possible to eliminate such problem as unstableness in the positions of the connection lines after the press work step A. These connecting members are cut in the trimming step E, so that electrical insulation between the connection lines is secured.

In the example of FIG. 11, the bus bars 11 and 12 are provided with the displacement absorption portions 11a and 12*a*, and the displacement absorption portions 147 are also provided halfway through the connection lines 141 through 146, so that it is possible to prevent an excessive Force from being applied to each portion in the bus bar modules 10 with respect to a change in the dimension of the unit batteries 1, and it is possible to receive the screw-fastening force when connecting the bus bars to the positive and negative pole terminals of the unit batteries making it possible to prevent an excessive force from being transmitted to the detection circuit side via the bus bars.

Further the terminals 13*a* through 13*e* of the detection circuits 13 protrude along the direction in which the unit batteries 1 are arranged, so that even when there is a change in the arrangement direction of the unit batteries 1 as a result of the charge and discharge of the unit batteries 1, there is exerted no force bending the terminals 13*a* through 13*e*, and there is no fear of fatigue fracture of the proximal portions of the terminals 13*a* through 13*e*, even if charge and discharge are repeatedly performed. Further, in the bus bar modules 10, the detection circuits 13 are between one bus bar 11 and the other bus bar 12, and are sufficiently smaller than the bus bars 11 and 12, so that, when a plurality of bus bar modules 10 are connected together, it is possible to secure relatively large spaces between the detection circuits 13, making it possible to enhance the degree of freedom in terms of the arrangement of the connection lines 141 through 146 connecting the terminals 13*a* through 13*e* and the unit batteries 1.

Figure 12:
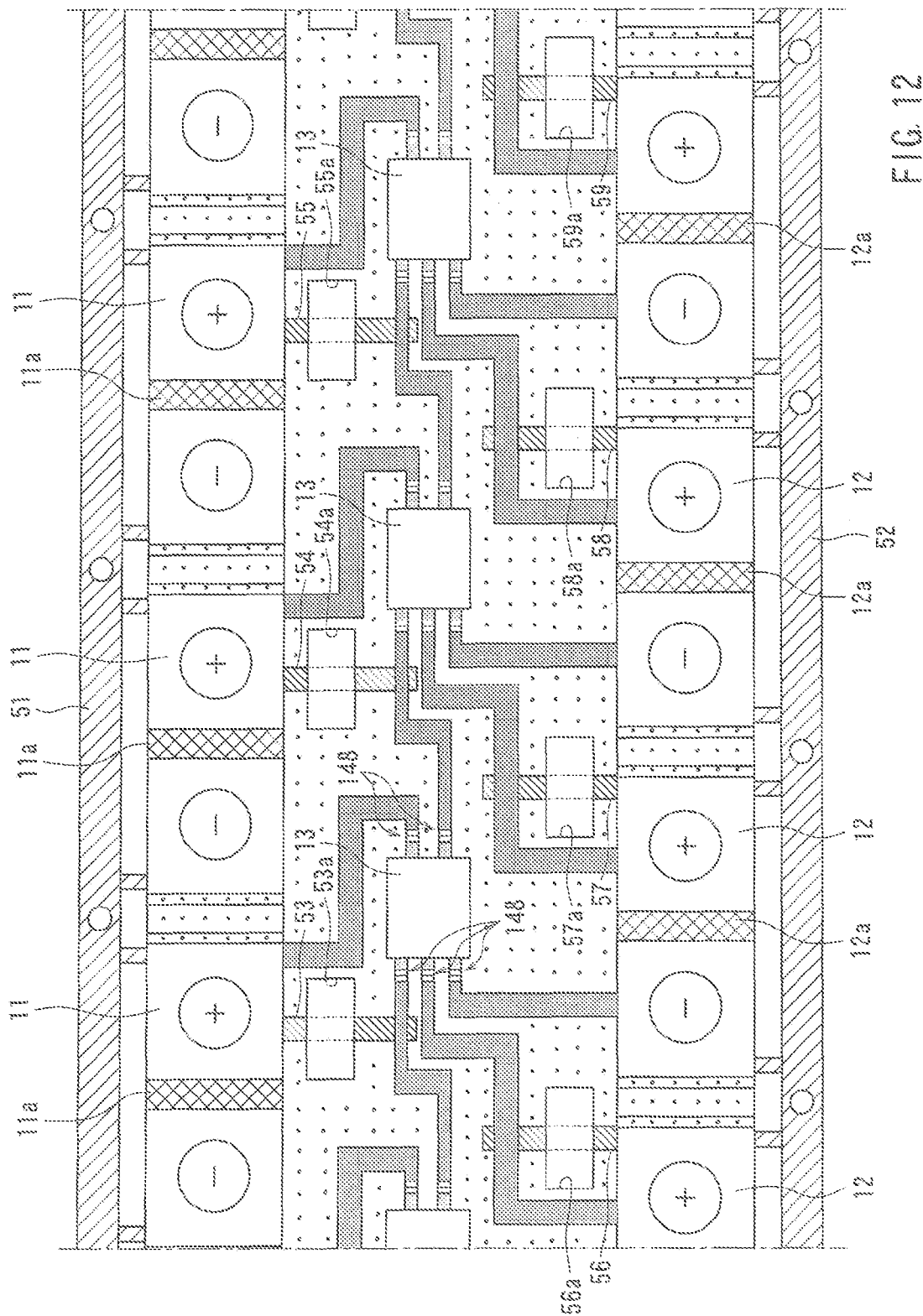
FIG. 12 is an explanatory view illustrating a second modification of the bus bar module of the embodiment of FIG. 1.
Figure 18:
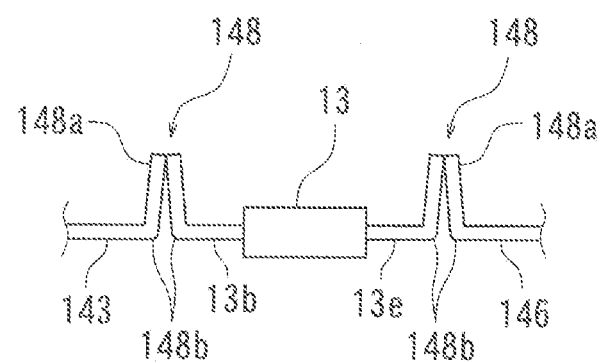
FIG. 18 is an enlarged side view illustrating an example of a displacement absorption portion provided between a terminal and a connection line of a detection circuit shown in FIG 12.

In the example shown in FIG. 12, instead of the displacement absorption portions 147 halfway through the connection lines 141 through 146 in the example of FIG. 11, there are provided displacement absorption portions 148 at the connection portions between the terminals 13*a* through 13*e* of the detection circuits 13 and the connection lines 141 through 146. As shown in the enlarged view of FIG. 18, the displacement absorption portions 148 are formed by upwardly bending the distal end portions of the terminals 13*b* and 13*e* and the distal end portions of the connection lines 143 and 146, and connecting the upper end portions 148 thereof to each other through welding. The proximal portion sides 148*b* of the bent portions are slightly spaced away from each other, and even if there is generated a displacement in the arrangement direction of the unit batteries 1 as a result of the charge and discharge of the unit batteries 1, it is possible to absorb the displacement through a change in the distance between the proximal portion sides 148 of the bent portions. While FIG. 18 shows the construction of two sets of displacement absorption portions 148, the other displacement absorption portions 148 are also of the same construction.

Otherwise, the construction of FIG. 12 is the same as that of FIG. 11, so the same portions are indicated by the same reference numerals, and a redundant description thereof will be left out.

Figure 13:
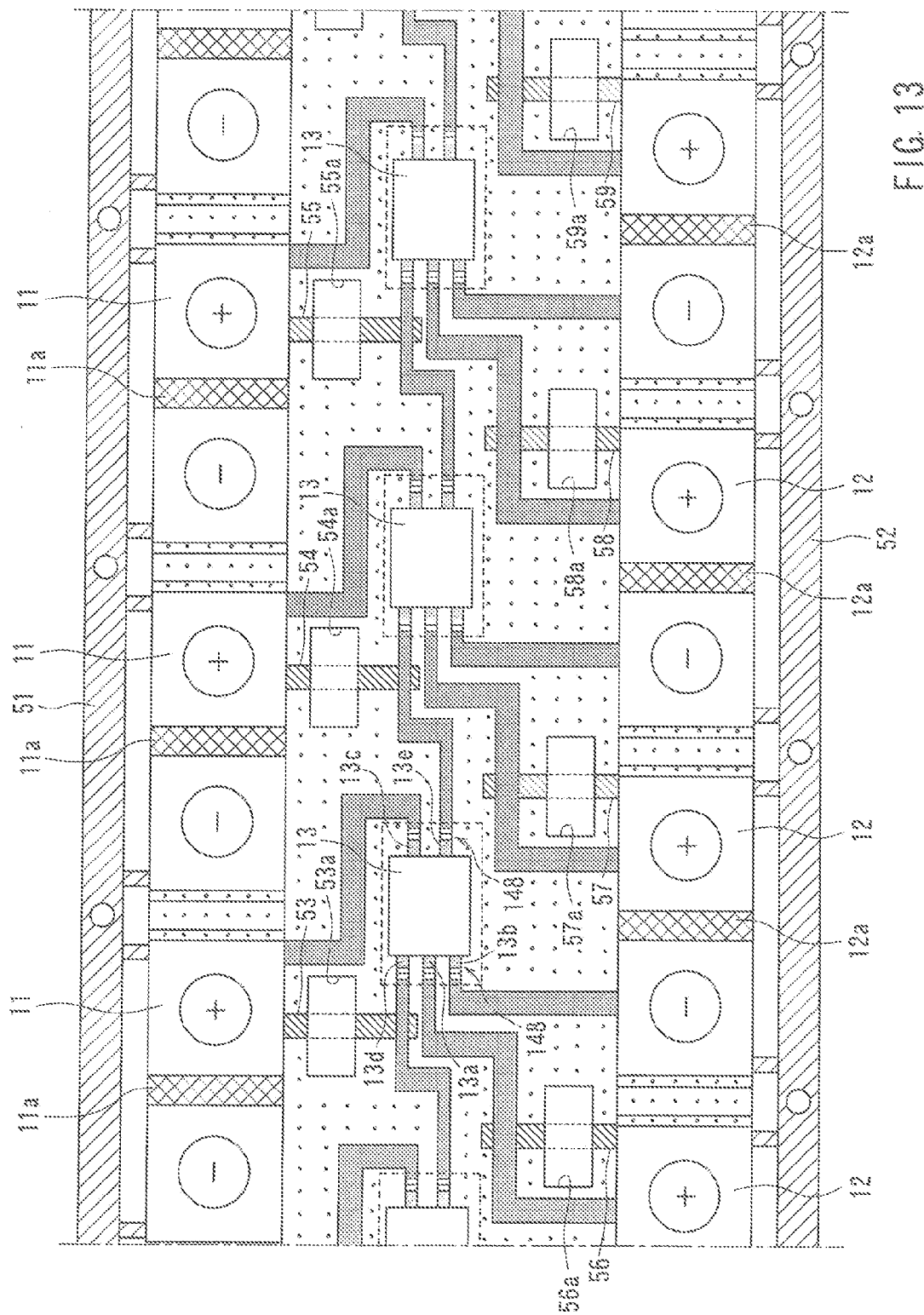
FIG. 13 is an explanatory view illustrating a third modification of the bus bar module of the embodiment of FIG. 1.
Figure 14:
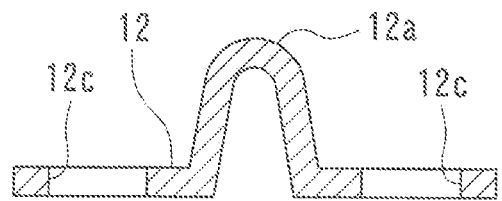
FIG. 14 is a sectional view taken along the line XIV-XIV of FIG. 11.

In the example shown in FIG. 13, the detection circuits 13 and the terminals 13*a* through 13*e* thereof in the same construction as shown in FIG. 12, are covered with molding resin. The molding ranges are indicated by the broken lines drawn around the detection circuits 13 in FIG. 13. The molding resin is selected so as to he of the same coefficient of thermal expansion as the ICs constituting the detection circuits 13 and the terminals 13*a* through 13*e* thereof; there is employed, for example, nylon resin or PBT (polybutylene terephthalate) resin. The resin molding is performed in the above-mentioned molding step D of FIG. 19, prior to the insert molding of the resin. In this way, the detection circuits 13 and the terminals 13*a* through 13*e* thereof are covered with resin, and are consolidated, whereby it is possible to protect the terminals 13*a* through 13*e* against changes in the dimensions of the unit batteries 1. If, in the trimming step E of FIG. 19, press work is performed the terminals 13*a* through 13*e* of the detection circuits 13 are not affected.

Also the example of FIG. 13 is of the same construction as that of FIG. 12 except for the molded portions; so, the same portions are indicated by the same reference numerals, and a redundant description thereof will be left out.

In the bus bar module of the above-described embodiment, two bus bars and the detection circuit are integrated with each other. In contrast, in another embodiment shown in FIGS. 6 through 8, four bus bars 31 through 34 and the detection circuit 35 are integrated with each other. Since four bus bars 31 through 34 axe integrated with each other, the detection circuit 35 is configured to detect the voltage of four unit batteries 1.

Figure 7:
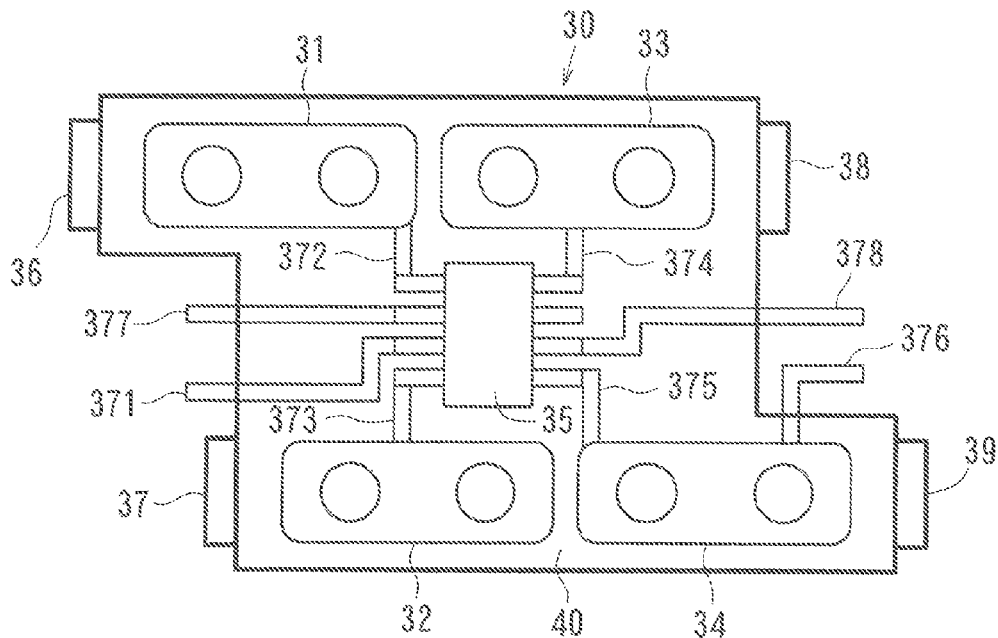
FIG. 7 is an explanatory view of a bus bar module in die embodiment of FIG. 6.
Figure 8:
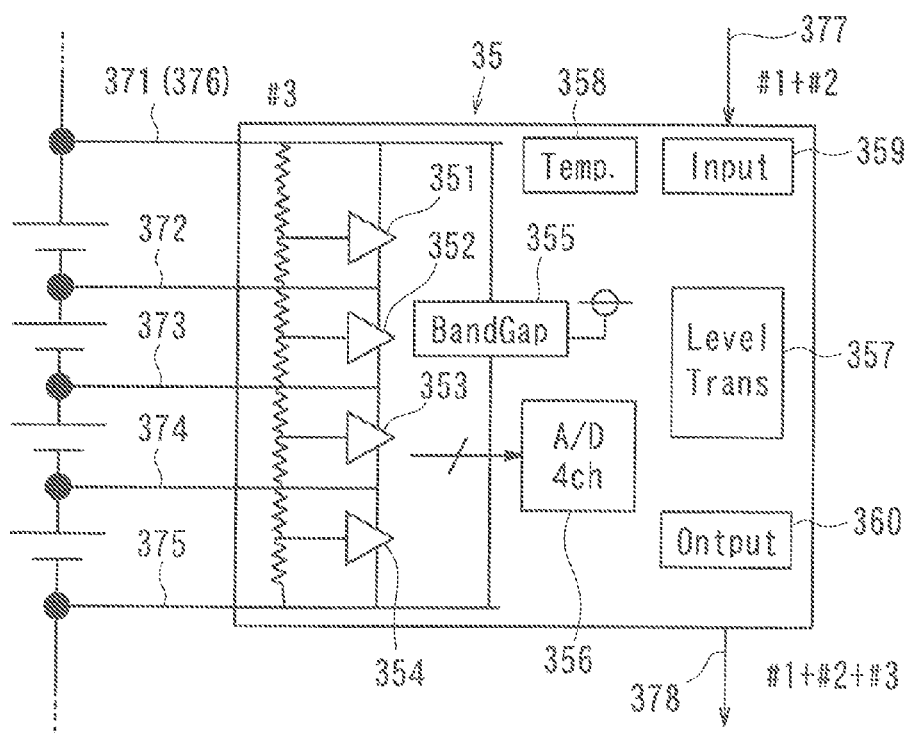
FIG. 8 is an electric circuit diagram illustrating a bus bar module in the embodiment of FIG. 6.

As is apparent from comparison of FIGS. 1 through 4 with FIGS. 6 through 8, the two constructions only differ from each other in the number of bus bars and in the number of unit batteries 1 constituting the object of detection for the detection circuit; otherwise, there is no basic difference in construction between the two. Thus, what has been described with reference to FIGS. 1 through 5 basically also refers to the embodiment of FIGS. 6 through 8, and a description of the same portions will be left out.

In FIG. 8, there are four operation amplifiers 351 through 354 for detecting the voltage of die four unit batteries 1, and the signals from the operation amplifiers 351 through 354 are successively read by a single A/D converter 356 to be converted to digital signals.

In the case of the embodiment of FIGS. 6 through 8, it is possible to form a battery module similar to the embodiment of FIGS. 1 through 4 by half the number of, i.e., twenty-four, bus bar modules 30. Generally speaking, the number of unit batteries forming a battery module is a multiple of four, so that, when as in the case of the embodiment of FIGS. 6 through 8, the bus bar module 30 is formed by four bus bars 31 through 34, it is possible to cope with an increase or reduction in the number of unit batteries 1 through an increase or reduction in the number of such bus bar modules 30. The voltage applied to the detection circuit 35 of FIG. 8 corresponds to that of four unit batteries, i.e., 14.4 V. Thus, as in the case of the embodiment described above, it is possible to lower the voltage withstanding performance of the detection circuit. Further, if fluctuations in the voltage of the unit batteries are taken into consideration, the voltage corresponding to the four unit batteries is approximately 20 V at the maximum, so that it is possible to commonly employ a component generally used in vehicles, making it advantageously unnecessary to develop a new component.

While the embodiments described above are applied to a lithium ion battery for hybrid vehicles, the present invention is also applicable to batteries for use other than that, such as electric automobiles; further, the present invention is also applicable to other kinds of battery, such as a nickel/hydrogen battery.

Otherwise, the present invention can be carried out in various forms without departing from the scope of the gist of the invention.

The invention claimed is:
1. A battery module comprising:
a plurality of unit batteries serving as secondary batteries arranged such that positive and negative poles of adjacent unit batteries are situated alternately; and
a plurality of bus modules, each of the plurality of bus bar modules including a plurality of bus bars for connecting positive poles and negative poles of the adjacent unit batteries and a detection circuit for detecting voltages of the unit batteries, wherein the plurality of bus bars and the detection circuit are united together with a molding resin to form each of the plurality of bus bar modules and the detection circuits of the plurality of bus bar modules are series-connected, wherein one of the plurality of bus bars of one of the plurality of bus bar modules connects the positive pole of one unit battery and the negative pole of a positive pole side unit battery situated on the positive pole side of the one unit battery in the battery module, and the other one of the plurality of bus bars connected to the negative pole of the one unit battery is connected to the positive pole of a negative pole side unit battery situated on the negative pole of the one unit battery in the battery module, and wherein the detection circuit of the one of the plurality of bus bar modules is connected between the one of the plurality of bus bars and the other one of the plurality of bus bars and is configured to detect the voltage of the one unit battery, and wherein each detection circuit is configured to:

receive a first voltage signal from the detection circuit of an adjacent bus bar module;

generate a second voltage signal; and output both the first voltage signal and the second voltage signal to the detection circuit of another adjacent bus bar module.

2. The battery module according to claim 1, wherein an input terminal and an output terminal of the detection circuit in each bus bar module respectively protrude toward the adjacent bus modules; the input terminal and the output terminal are successively connected in the order in which they are arranged in the battery module; and each detection circuit transmits the detected voltage to a battery controller for conducting charge and discharge of the batteries properly as a series of serial signals.

3. The battery module according to claim 1, wherein the bus bar modules adjacent to each other are connected by connection portions provided on adjacent side portions of the bus modules.

4. The battery module according to claim 1, wherein the bus bars of the bus bar modules are two or four bus bars connecting the positive and negative poles so as to directly connect in series three or five unit batteries adjacent to each other, and wherein the detection circuit detects the voltage of two or four unit batteries of three or five unit batteries.

5. The battery module according to claim 1, wherein the detection circuit is equipped with a detection terminals connected to the positive and negative poles of each unit battery constituting the object of detection, and an output terminal outputting detection signal, and wherein each of the terminals protrudes from the detection circuit along the direction in which the unit batteries are arranged when formed into a battery module.

6. The battery module according to claim 1, wherein the detection circuit is equipped with a detection terminals connected to the positive and negative poles of each unit battery constituting the object of detection, and an output terminal outputting a detection signal, and wherein at least the portion where the detection terminals and the output terminal protrude from the detection circuit is covered with molding resin.

7. The battery module according to claim 1, wherein a displacement absorption portion is provided between the end portions of the bus bar connected to the positive and negative poles of the adjacent unit batteries, and wherein the displacement absorption portion permits mechanical relative displacement while maintaining the electrical connection between the end portions of the bus bar.

8. The battery module according to claim 1, wherein the detection circuit is equipped with a detection terminal connected to both the positive and negative poles of each unit battery constituting the object of detection, and an output terminal configured to output a detection signal, wherein the detection terminal is connected to the other end of a connection line one end of which is connected to the bus bar, wherein the output terminal is connected the other end of a connection line one end of which is connected to an output side circuit, wherein there is provided a displacement absorption portion at least in a part of the route between each terminal of the detection circuit and each connection line thus connected to each other, and wherein the displacement absorption portion permits mechanical relative displacement while maintaining the electrical connection of both ends of the displacement connection portion or the connection lines.

9. The battery module according to claim 8, wherein the displacement absorption portion has a metal plates constituting the terminals or connection lines and exhibiting raised portions raised erect in a direction orthogonal to the plane where the terminals and the connection lines are arranged, and wherein the distal end portion sides of the raised portions of the metal plates are connected to each other, with the proximal end portion sides of the raised portions being capable of being spaced away from each other.

10. The battery module according to claim 1, wherein, when connected to the positive and negative poles of the unit battery, the bus bar module is situated so as to be spaced away from the outer surface of the unit battery except for the positive and negative poles thereof by a predetermined gap.

* * * * *